United States Patent
Hansson et al.

(10) Patent No.: US 8,676,020 B2
(45) Date of Patent: Mar. 18, 2014

(54) REPAIR BOX FOR OPTICAL FIBRE COMPOSITE ELECTRIC POWER CABLE

(75) Inventors: Anders S. Hansson, Lyckeby (SE); Niklas Norde, Karlskrona (SE); Per Fosselius, Lyckeby (SE); Claes Sonesson, Rödeby (SE)

(73) Assignee: ABB Technology AG, Zürich (CH)

( * ) Notice: Subject to any disclaimer, the term of this patent is extended or adjusted under 35 U.S.C. 154(b) by 192 days.

(21) Appl. No.: 13/057,884

(22) PCT Filed: Apr. 29, 2009

(86) PCT No.: PCT/EP2009/055222
§ 371 (c)(1),
(2), (4) Date: Jun. 20, 2011

(87) PCT Pub. No.: WO2010/124733
PCT Pub. Date: Nov. 4, 2010

(65) Prior Publication Data
US 2012/0033928 A1    Feb. 9, 2012

(51) Int. Cl.
*G02B 6/00* (2006.01)
(52) U.S. Cl.
USPC .......................................................... 385/135
(58) Field of Classification Search
USPC .................................. 385/101, 135
See application file for complete search history.

(56) References Cited

U.S. PATENT DOCUMENTS

| | | | |
|---|---|---|---|
| 4,367,917 A | 1/1983 | Gray | |
| 4,494,822 A * | 1/1985 | Harvey | 385/71 |
| 4,580,874 A | 4/1986 | Winter et al. | |
| 5,076,657 A | 12/1991 | Toya et al. | |
| 5,142,763 A | 9/1992 | Toya et al. | |
| 5,997,186 A * | 12/1999 | Huynh et al. | 385/99 |
| 7,393,144 B2 * | 7/2008 | Khemakhem et al. | 385/75 |
| 2009/0180739 A1 * | 7/2009 | Khemakhem et al. | 385/75 |
| 2011/0188803 A1 * | 8/2011 | Kordahi et al. | 385/24 |
| 2011/0286704 A1 * | 11/2011 | Rubinstein et al. | 385/99 |

FOREIGN PATENT DOCUMENTS

| | | |
|---|---|---|
| DE | 4030291 A1 | 4/1991 |
| EP | 0646817 A2 | 4/1995 |
| EP | 1553675 A2 | 7/2005 |
| EP | 1998340 A | 12/2008 |
| JP | 59212813 A | 12/1984 |
| JP | 3118712 A | 5/1991 |
| JP | 7212952 A | 8/1995 |

OTHER PUBLICATIONS

PCT/ISA/210—International Search Report Jan. 28, 2010.
PCT/ISA/237—Written Opinion of the International Searching Authority—Jan. 28, 2010.
Chinese Office Action (With Translation)—Feb. 16, 2013 (Issued in Counterpart Application No. 20098013268303).

* cited by examiner

*Primary Examiner* — Sung Pak
(74) *Attorney, Agent, or Firm* — Venable LLP; Eric J. Franklin

(57) ABSTRACT

A cable joint for jointing two cable ends of an optical fiber cable of an optical fiber composite electric power cable including an electric power cable and an optical fiber cable. The cable joint includes a repair box arranged between the two cable ends of the optical fiber cable. The repair box is arranged within the optical fiber composite electric power cable and further includes storage for storing extra length needed for jointing optical fibers of the optical fiber cable.

7 Claims, 3 Drawing Sheets

US 8,676,020 B2

REPAIR BOX FOR OPTICAL FIBRE COMPOSITE ELECTRIC POWER CABLE

CROSS-REFERENCE TO RELATED APPLICATIONS

This application is the national phase under 35 U.S.C. §371 of PCT/EP2009/055222 filed 29 Apr. 2009

FIELD OF THE INVENTION

The present invention relates generally to the field of power cables, and in particular to optical fibre composite electric power cables.

BACKGROUND OF THE INVENTION

An optical fibre composite electric power cable is a cable wherein an optical fibre is included in an electric power cable. Such optical fibre composite electric power cable may for example be used in offshore applications, such as submarine power and/or communication cables. Another example is in installation environments that require monitoring of the operation of electricity, wherein the optical fibres may be used for detecting temperature distribution of the power cable.

Two cable ends often need to be connected to each other, for example when installing the cables in the application at hand, or in a jointing process if the cable is broken and require repair. When jointing the optical fibre cable of the optical fibre composite electric power cable, it is realized that a certain extra length has to be added in order to accomplish the jointing of the cable ends.

JP 59212813 describes a way of handling the extra length required for jointing cable ends of an optical fibre cable. In accordance with the teachings of this document, the extra length is handled by arranging the optical fibre cable along and between the power cables in a wave-like pattern. The presented solution is adequate for rather thin optical fibres, which can easily be bent in any desired manner. However, as the diameter of the optical fibre cable increases difficulties occur in that the length over which the extra length is arranged increases considerably, and may range up to several hundreds of meters. Further, such large-diameter optical fibre cables cannot be bent in just any way and for fibre cables having diameters exceeding a certain value this solution is not at all applicable. Further yet, the outer dimensions of the optical fibre composite electric power cable may be increased, which causes difficulties for example during transportation of the cable.

From EP 646 817 A2 means for jointing fibre optical cables is known. In particular, a fibre optic jointing cabinet is used for repairing the fibre optic cable. This solution functions well for repairs in an existing installation, for example in an offshore installation. A disadvantage is that the joint is rigid, and for repairs performed before cable installations such rigid joints present problems in that the transportation and other handling of the cable is rendered more difficult.

Another disadvantage is that the outer dimension of the composite electrical/fibre optical cable is increased and the handling is again made more complicated. Further, such an increased dimension cannot be handled during manufacturing of the composite electrical power cable, should the fibre optical cable be broken at the manufacturing, since the manufacturing machines etc. are adapted for the originally intended dimension.

In view of the above, it would be desirable to provide an improved cable joint, which can be used for different kinds of repair needs and for optical fibre cables of any diameter.

SUMMARY OF THE INVENTION

It is an object of the invention to provide a cable joint overcoming or at least alleviating the above-mentioned shortcomings of the prior art.

It is a particular object of the invention to provide a cable joint, by means of which optical fibre cables of any dimension can be repaired.

It is another object of the invention to provide a cable joint, by means of which optical fibre cables can be repaired at any time, i.e. prior to installation as well as when already installed.

It is still another object of the invention to provide a cable joint, by means of which the outer dimensions of the composite cable can be maintained.

It is still another object of the invention to provide a cable joint, by means of which no extra length of the optical fibre cable is created.

In accordance with the invention, a cable joint is provided for jointing two cable ends of an optical fibre cable of an optical fibre composite electric power cable comprising an electric power cable and such an optical fibre cable. The cable joint comprises a repair box arranged between the two cable ends of the optical fibre cable. The repair box is arranged within the optical fibre composite electric power cable and the repair box further comprises means for storing extra length of optical fibres needed for jointing the optical fibres of the optical fibre cable. By means of the invention, an improved and flexible jointing of cables is provided, wherein the outer dimensions of an optical fibre composite electric power cable is maintained. Further, the extra length of the optical fibre cable conventionally required for the jointing process is avoided entirely by means of the invention, as the extra length is required only for the optical fibres of the optical fibre cable. Further yet, the cable joint in accordance with the invention can be utilized for repairs both prior to installation thereof as well as after.

In accordance with an embodiment of the invention the optical fibre composite electric power cable comprises at least two electric power cables and the repair box is arranged within a space created between these at least two electric power cables. To use the space provided between the electric power cables provides an excellent way of including the cable joint without altering the outer dimensions of the optical fibre composite electric power cable.

In another embodiment of the invention, the repair box is shaped in dependence on the lay length of the at least two electric power cables. By means of this feature, the size of the repair box can be optimized in relation to the available space. Further, the cable joint is held firmly in place in such a design.

In still another embodiment of the invention, the repair box is arranged within the optical fibre composite electric power cable so as to maintain outer dimensions of the optical fibre composite electric power cable. Thereby the optical fibre composite electric power cable can be handled without any special attention, for example during transportation thereof.

Further, the characteristics of the optical fibre composite electric power cable is also maintained, for example its bending characteristics.

In still another embodiment of the invention, the repair box comprises openings arranged at opposing ends thereof. Each of the openings comprises a pipe that is adapted to receive one of the two cable ends of the fibre optical cable. The pipes are in an embodiment made of the same material as the optical fibre cable. The repair procedure is thereby greatly facilitated by means of this feature, since the soldering of pieces of same material is less complicated than the soldering of pieces of different material. Further, the cable joint is easily adaptable to the material of the sheath of the optical fibre cable at hand.

Further features and advantages thereof will become clear upon reading the following detailed description of embodiments in conjunction with the attached drawings.

DETAILED DESCRIPTION OF EMBODIMENTS OF THE INVENTION

Figure 1:
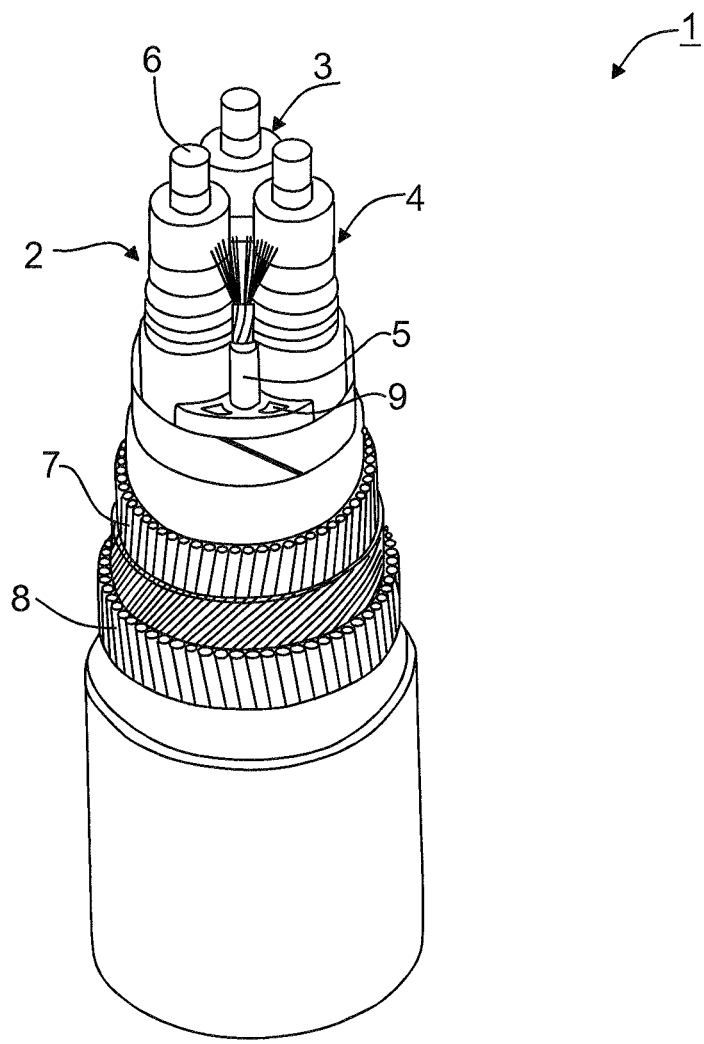
FIG. 1 illustrates a three-core optical fibre composite electric power cable.

FIG. 1 illustrates a three-core optical fibre composite electric power cable 1, in the following denoted composite cable 1, comprising three power cables 2, 3, 4 and an optical fibre cable 5. The power cable 2 comprises a conductor core 6, in turn comprising a number of wires in conventional manner.

The power cable 2 further comprises insulation layers, inner and outer semi-conducting layers and water impervious layers also in conventional manner. The other two power cables 3, 4 are similar or identical to the described power cable 2. The power cables 2, 3, 4 are helically wrapped with a certain lay length. The composite cable 1 further comprises sheathing layers and armouring layers 7, 8.

The spaces between the assembled power cables 2, 3, 4 are filled with a suitable filling material 9, such as PE (polyethylene) or PVC (polyvinyl chloride) filler. The optical fibre cable 5 is in one embodiment placed within one of these spaces and within the filler material 9. The optical fibre cable 5 comprises a number of optical fibres placed inside a metal tube, as is illustrated in the figure.

Figure 2:
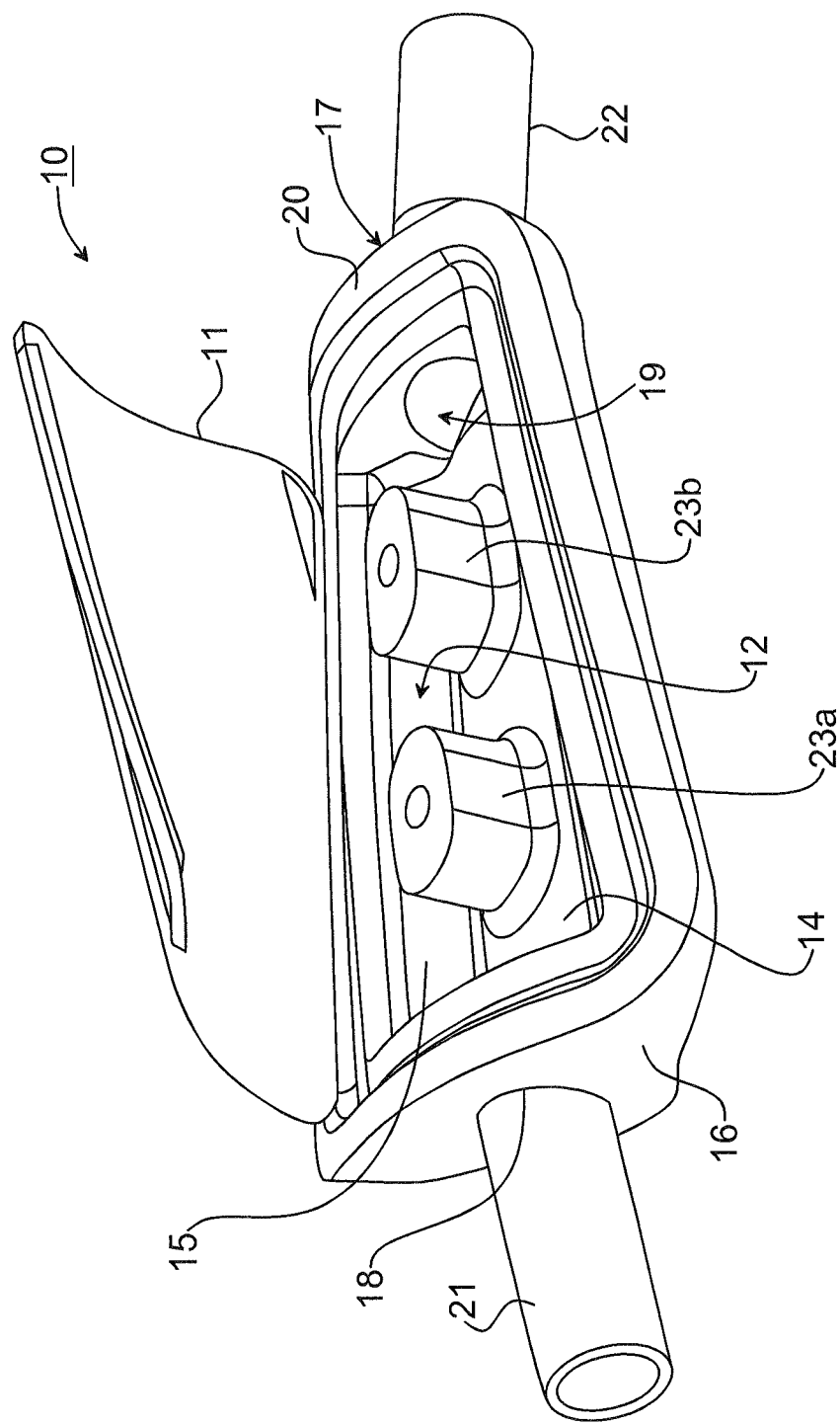
FIG. 2 illustrates an embodiment of the cable joint in accordance with the present invention.

FIG. 2 illustrates a cable joint 10 in accordance with the invention. The cable joint 10 comprises a repair box 20 being a suitably shaped box having a lid 11 and a cavity 12. The cavity 12 is formed by the lid 11 when closed, by inner wall sides 15 and by a bottom side 14. When a repair procedure is finished, the lid 11 is welded, glued, soldered or otherwise fastened to the repair box 20 in a watertight and gas tight manner.

The space of the cavity 12 is used for storing the extra length of the optical fibres of the optical fibre cable 5. It is noted that no extra length of the optical fibre cable 5 per se is needed, but an extra length is added only to the optical fibres thereof.

Since the size of the cable joint 10, and thus the repair box 20, is to be kept so as not to affect the outer dimension of the composite cable 1, consideration has to be made when choosing which fibre-jointing method to use. If only a few optical fibres are to be repaired, a jointing method comprising the use of space-requiring jointing sleeve can be used. However, if many of the optical fibres of the optical fibre cable 5 are to be repaired, then a less space-demanding method should be chosen, for example a method including recoating of the plastic layer of the optical fibres, i.e. a joint at least approaching a manufacturers' joint.

The repair box 20 further comprises openings 18, 19 at two opposing ends 16, 17 thereof through which two ends of the optical fibres of the optical fibre cable 5 are to be inserted. The openings are preferably provided with hollow pipes 21, 22 connected to the repair box 20 in a waterproof manner. At a repair, the pipes 21, 22 are soldered or otherwise connected to the metal tube of the optical fibre cable 5. The material of the pipes 21, 22 is preferably chosen to be the same as the metal tube of the fibre cable 5. That is, if the metal tube of the fibre cable 5 is made of copper, then the pipes 21, 22 are preferably made of copper as well. Thereby a much-facilitated repair is enabled, since the soldering of two pieces of same material, having the same properties, is less complicated than the soldering of pieces of different material. It is noted that the method for fastening the pipes 21, 22 to the metal tube of the fibre cable 5 can be chosen suitably, for example by soldering, gluing or any combination of fastening methods.

The shape of the repair box 20 is adapted in dependence on the space that is available in a certain application. For example, in the illustrated composite cable 1 having three cable cores 2, 3, 4, the repair box 20 could be shaped in a triangular shape in order to fit between two of the power cables. The power cables 2, 3, 4 are wrapped helically, i.e. stranded, and the distance in which a strand makes one complete turn about an axis parallel to the composite cable length is known as lay length. In an embodiment, the repair box 20 is formed in dependence on the lay length of the power cables 2, 3, 4. Thereby the size of the repair box 20 can be optimized in relation to the space that is available. Further, the cable joint 10 is held firmly in its intended place in such a design.

Depending on the intended application of the composite cable 1, the repair box 20 may further be provided with means for preventing implosion of the repair box 20. In an underseas application, wherein the composite cable 1 may be placed several hundreds of meters down in the water, the pressure on the repair box 20 becomes very high. One or more projections 23a, 23b are therefore provided for preventing the lid 11 from imploding.

The repair box 20 is made of any suitable material. The material is preferably chosen in dependence on the requirements of the intended application. In an underseas application a material having highly non-corrosive properties is preferably chosen.

Figure 3A:
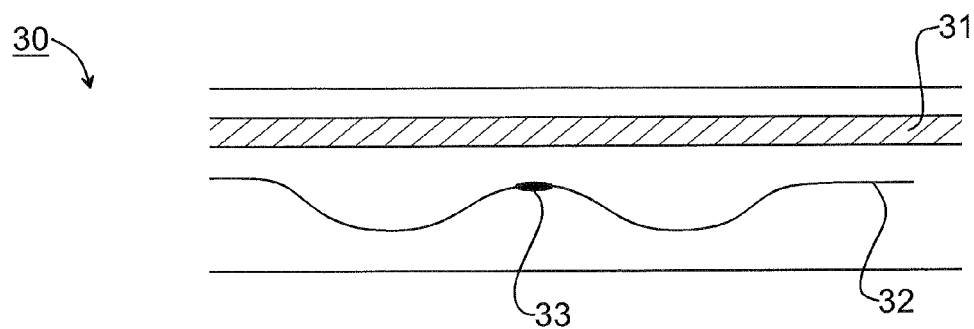
FIGS. 3a and 3b illustrate an advantage of the invention as compared to known joints and jointing methods.
Figure 3B:
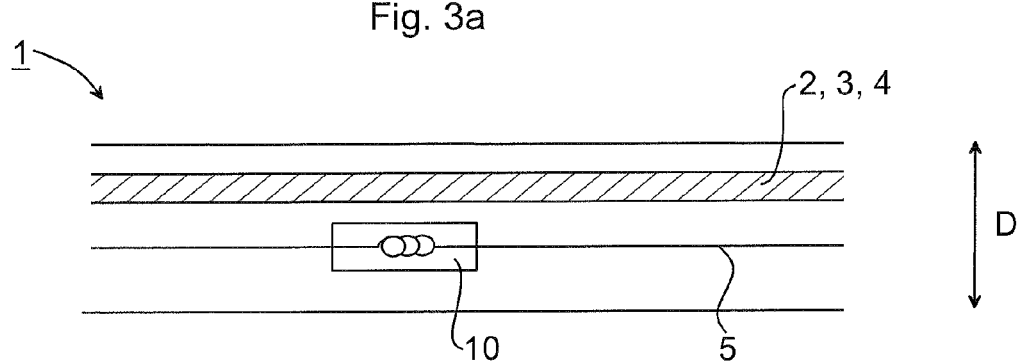

FIGS. 3a and 3b illustrate an advantage of the invention as compared to known joints and jointing methods. FIG. 3a illustrates a composite cable 30 comprising an electric power cable 31 and an optical fibre cable 32. In this illustration, a joint 33 is used that requires that the extra length of the optical fibre cable 32 is taken care of by undulating the optical fibre cable 32 along the length of the composite cable 31. As described in the introductory part of the present application, this is not a functioning solution for e.g. optical fibre cables of large dimensions.

FIG. 3b illustrates the composite cable 1 having a cable joint 10 in accordance with the invention. The power cables 2, 3, 4 are illustrated schematically as a single power cable. The optical fibre cable 5 is located between the power cables 2, 3, 4 and comprises the cable joint 10 comprising the repair box 20. The outer dimension, i.e. the outer diameter D of the composite cable 31 is also illustrated. The extra length of the optical fibres required when repairing the optical fibre cable 5 is stored within the repair box 20. Further, the size and placement of the repair box 20 enables the outer dimensions of the composite cable 1 to be maintained as before the repair. Besides maintaining the outer dimensions of the composite cable 1, its properties, such as flexure and tensile strength, are also maintained.

The invention has been described in connection with a three-core power cable. It is however noted that the invention is not restricted to such cables, but other cables could benefit from the described invention. Power cables for different voltage levels can benefit from the present invention, for example power cables for medium-voltages and power cables for high-voltages, e.g. several tens of kVs.

The invention claimed is:

1. A cable joint for jointing two cable ends of an optical fiber cable of an optical fiber composite electric power cable, comprising:
    an electric power cable;
    an optical fiber cable; and
    a repair box arranged between two cable ends of said optical fiber cable, said repair box being arranged within said optical fiber composite electric power cable, said repair box comprising storage configured to store extra length needed for jointing optical fibers of said optical fiber cable.

2. The cable joint according to claim 1, wherein said optical fiber composite electric power cable comprises at least two electric power cables, and wherein said repair box is arranged within a space created between said at least two electric power cables.

3. The cable joint according to claim 2, wherein said repair box is shaped in dependence on a lay length of said at least two electric power cables.

4. The cable joint according to claim 1, wherein said repair box is arranged within said optical fiber composite electric power cable so as to maintain outer dimensions of said optical fiber composite electric power cable.

5. The cable joint according to claim 1, wherein said repair box comprises openings arranged at opposing ends thereof, each of said openings comprising a pipe being adapted to receive one of said two cable ends of said fiber optical cable.

6. The cable joint according to claim 5, wherein said pipes are made of a same material as said optical fiber cable.

7. The cable joint according to claim 1, wherein said electric power cable comprises a three-core submarine cable.

* * * * *